FIG. 1

Inventors
PETER FORTESCUE
DAVID NICOLL
By
Atty's

FIG. 4

Inventors
PETER FORTESCUE
DAVID NICOLL
By
Atty's

Inventors
PETER FORTESCUE
DAVID NICOLL

April 27, 1965 P. FORTESCUE ETAL 3,180,800
NEUTRONIC REACTOR INCLUDING MEANS FOR UNLOADING AND
HERMETICALLY ENCLOSING SPENT FUEL ELEMENTS
Original Filed Nov. 21, 1958 9 Sheets-Sheet 8

Inventors
PETER FORTESCUE
DAVID NICOLL

By

Attys

April 27, 1965 P. FORTESCUE ETAL 3,180,800
NEUTRONIC REACTOR INCLUDING MEANS FOR UNLOADING AND
HERMETICALLY ENCLOSING SPENT FUEL ELEMENTS
Original Filed Nov. 21, 1958 9 Sheets-Sheet 9

Inventors
PETER FORTESCUE
DAVID NICOLL
By
Attys

United States Patent Office 3,180,800
Patented Apr. 27, 1965

3,180,800
NEUTRONIC REACTOR INCLUDING MEANS
FOR UNLOADING AND HERMETICALLY
ENCLOSING SPENT FUEL ELEMENTS
Peter Fortescue, La Jolla, and David Nicoll, Del Mar, Calif., assignors, by mesne assignments, to the United States of America as represented by the United States Atomic Energy Commission
Original application Nov. 21, 1958, Ser. No. 775,578, now Patent No. 3,138,535, dated June 23, 1964. Divided and this application Apr. 22, 1964, Ser. No. 367,274
5 Claims. (Cl. 176—30)

The present application is a division of our application for patent Serial No. 775,578, filed November 21, 1958, which has issued as U.S. Patent No. 3,138,535 on June 23, 1964.

The present invention relates generally to neutronic reactors and is more particularly directed to a nuclear reactor including means for unloading and hermetically enclosing fuel elements.

It is desirable, if not necessary, in a neutronic reactor to provide means for loading and unloading the fuel elements, as well as the control rods, in a precise and efficient manner from a position outside of the main reactor vessel. Maximum safety precautions must be taken during the loading and unloading operations, in order to avoid leakage or radiation outside of the reactor. This problem can be particularly difficult in connection with a pressurized reactor vessel, such as is used in connection with gas-cooled power reactors.

An object of the invention is to provide spent fuel unloading mechanism, including means for sealing the spent fuel element within a container after it is removed from the reactor core and before it is placed in a storage facility.

Other objects and advantages will be apparent from the following description of the selected embodiment illustrated in the accompanying drawings, wherein.

Figure 1:
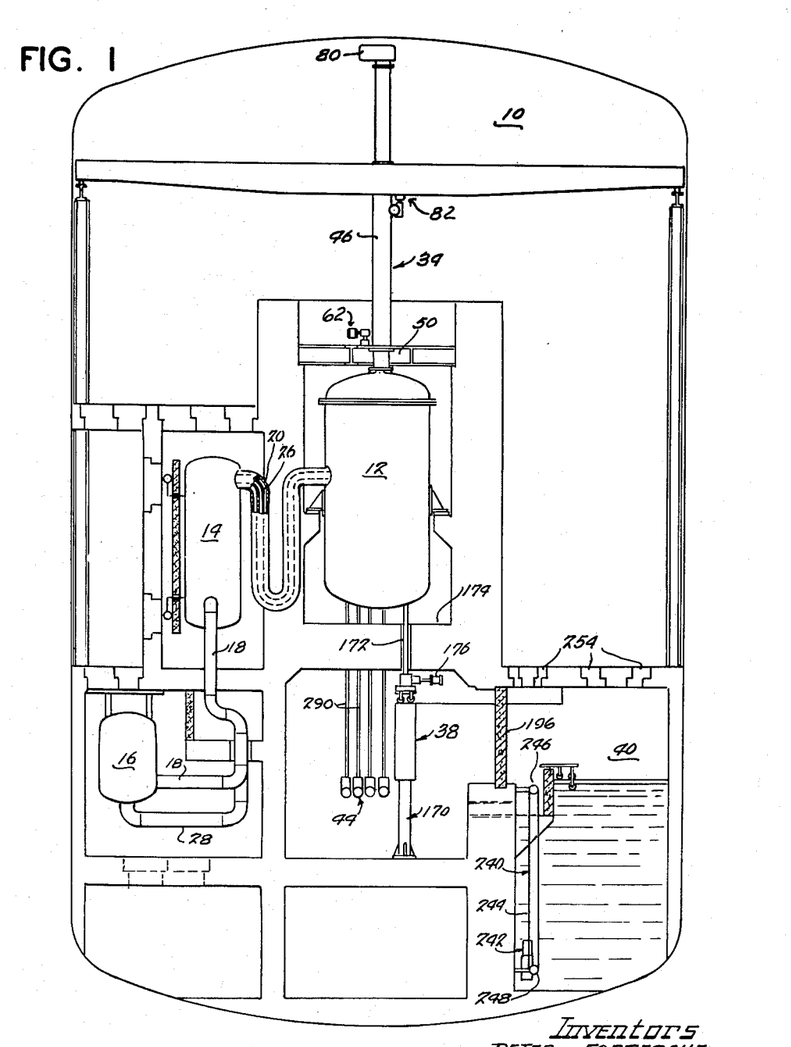
FIG. 1 is a schematic illustration of a gas-cooled neutronic reactor embodying the invention.

As seen particularly in FIG. 1 of the drawings, the invention is shown in connection with a gas-cooled neutronic reactor 10, wherein pressurized gas, such as helium, is used for carrying the heat produced within the reactor vessel 12. Such a system includes, in addition to the reactor vessel, one or more steam generators 14, and a source 16 of pressurized gas coolant which is in fluid communication with the steam generator 14 and the reactor vessel 12. The relatively cool gas is introduced into the reactor vessel to absorb heat therefrom and is then circulated back to the steam generator 14 where the heated gases are utilized in the production of steam. The pressure gas source or circulator 16 is in fluid communication with the steam generator 14 through a pipe 18 which affords the introduction of gas into the outer wall portion of the steam generator. This relatively cool gas passes through an outer chamber of the generator and is then transferred through the outer duct 20 of a pair of concentric ducts to the reactor vessel. The gas enters an outer chamber 22 of the reactor vessel 12 (FIG. 2) and is circulated through the vessel and into the central portion or core 24 thereof containing the fissionable material. From the core of the reactor vessel the pressurized gas, which has absorbed a considerable amount of heat due to neutronic activity within the reactor, is passed back to the steam generator through the inner duct 26 of the pair of concentric ducts. In the steam generator 14 (FIG. 1), the heated gases are passed through a water vessel or the like (not shown), in order to produce steam which may be utilized for power purposes. The heat dissipated gases are then fed back to the gas circulator mechanism through a return pipe 28. It is understood, therefore, that in the described system the reactor vessel 12 is under pressure from the coolant gas during its operation.

Figure 2:
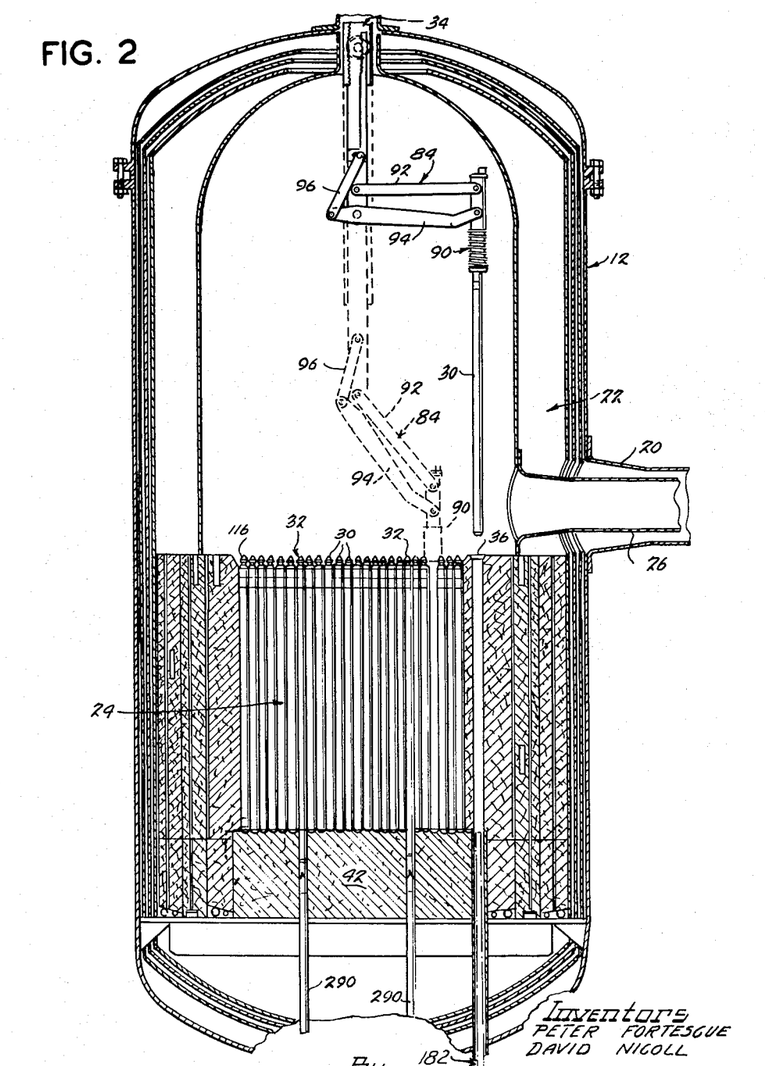
FIG. 2 is an enlarged cross-sectional view of the reactor vessel seen in FIG. 1.

As noted in FIG. 2 of the drawings, the core or center portion 24 of the reactor vessel includes a plurality of elongated fuel elements 30 which are suitably and removably disposed in fixed relation to each other in a generally cylindrical area. Dispersed among the fuel elements are a plurality of control rods 32 of neutron absorbing material, which are provided for the regulation of a self-sustaining neutron chain reaction in the vessel. After a period of operation, the fuel elements become less reactive due to burn up of fissionable material and, therefore, must be replaced. Similarly, the control rod elements lose much of their neutron absorbing capacity after a time and must also be replaced. The control rods and the fuel elements are not necessarily used up in the same period and, consequently, in the ordinary course of operation, the rods and fuel elements are selectively replaced throughout the period of operation of the neutronic reactor.

For safety reasons, it is necessary that the replacement of the fuel elements and control rods be effected without undue exposure of personnel to radioactivity from the reactor. Furthermore, in connection with the spent fuel elements, it is necessary to provide suitable means for handling and storing the spent fuel until such time as the radioactivity of the elements has decayed to a safe level to permit the fuel elements to be processed for the recovery of fissionable material.

The present invention provides an effective and efficient system of means for handling the loading and unloading of fuel elements and control rods in a precise manner, and in a way such that escape of radiation from the neutronic reactor system is minimized.

Generally, the illustrated structure includes a fuel element pick-up and transfer mechanism 34, shown generally in FIG. 2, which is adapted to selectively engage one of the fuel elements or control rods, and to raise such element or rod relative to the reactor core 24 and deposit it in a discharge passage 36 (FIG. 2) adjacent to the periphery of the core. The spent fuel element or rod passes downwardly through the reactor vessel to a transfer coffin 38 (FIG. 1) where it is sealed in a canister and then removed to a storage vessel 40. After the spent fuel element has been stored under water for a sufficient length of time to dissipate its radioactivity, it may be removed from the storage vessel for processing.

As indicated above, the fuel elements 30 and control rods 32 are disposed in a generally cylindrical core 24 at the center of the reactor vessel 12. The lower end of the fuel elements rest on a horizontal base 42 (FIG. 2) of reflecting material and the control rods are suitably detachably connected to a drive mechanism 44 (FIG. 1) in supported relation thereto. The upper end of each of the fuel elements and control rods is generally conical with a reduced neck portion being provided in order to afford engagement by the grappling or pick-up means 34, as seen generally in FIG. 2.

After the element has been raised out of the core of the reactor, it is moved laterally to the discharge passage 36 which is located at one side of the core, as seen in FIG. 2 of the drawings. The removed element is lowered into this passage to a position of support by a fuel raising and lowering mechanism 170 (FIG. 1) located below the reactor vessel. The discharge passage 36 includes a section 172 at the bottom of the vessel which passes through a shield below the latter, and the section 172 is selectively sealed at its lower end by means of an isolation valve 176 (FIG. 3).

Figures 5, 7, 8, 9:
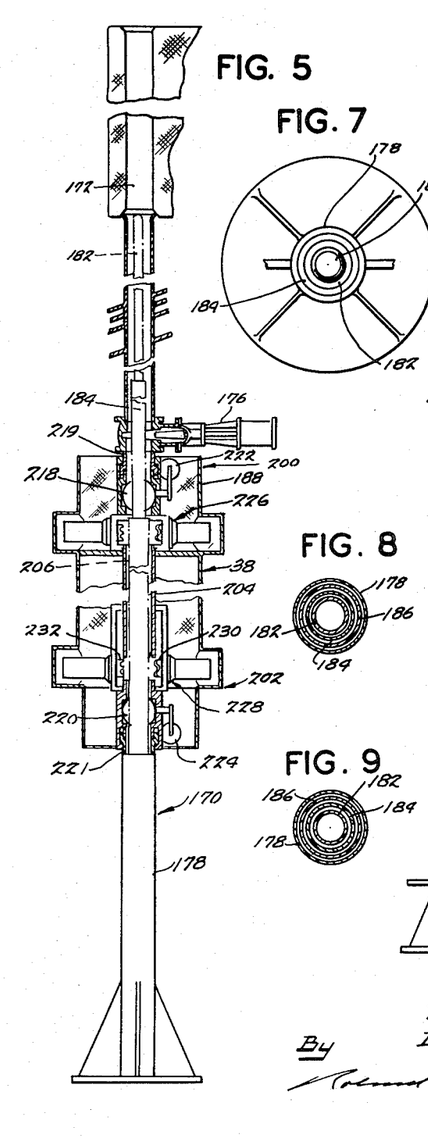
FIG. 5 is an enlarged fragmentary view of the structure in FIG. 3, with portions broken away and in section.
FIG. 7 is a plan view of the structure in FIG. 6.
FIG. 8 is a sectional view taken along the line 8—8 in FIG. 6.
FIG. 9 is a sectional view taken along the line 9—9 in FIG. 6.
Figure 6:
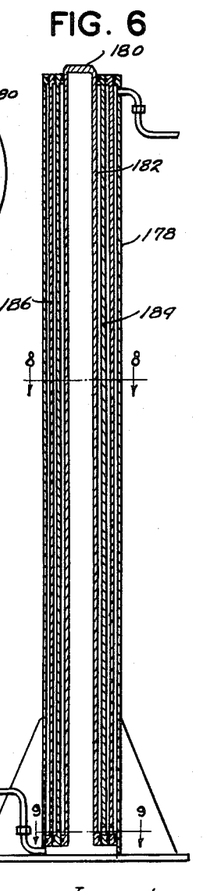
FIG. 6 is an enlarged sectional view of the tube at the lower end of the structure in FIG. 5.

With reference first to FIG. 5, it is seen that the fuel raising and lowering mechanism 170 includes a generally cylindrical housing 178, including therein a telescopic piston which is in three sections 182, 184 and 186, respectively, and of sufficient length to move upwardly through tube 172 and into the lower end of the discharge passage 36 in the reactor vessel. The upper end 180 of the upper piston section 182 (FIG. 6) is generally flat, or otherwise suitably shaped, so as to supportingly engage the lower end of a fuel element or control rod disposed in the discharge passage. Intermediate the discharge tube or passage 172, which extends downwardly from the reactor vessel, and the upper end of the housing 178 for the telescopic piston there is afforded space for entry of the transfer coffin 38 in vertically aligned relation to the discharge passage 172 and the telescopic piston 182. Generally, this transfer coffin includes a vertically disposed tubular portion 188 through which the telescopic piston is movable so that the upper end 180 of the piston section 182 may be moved upwardly into engagement with the fuel element in the discharge passage 36 and then retracted so as to place the fuel element within the transfer coffin.

Figure 3:
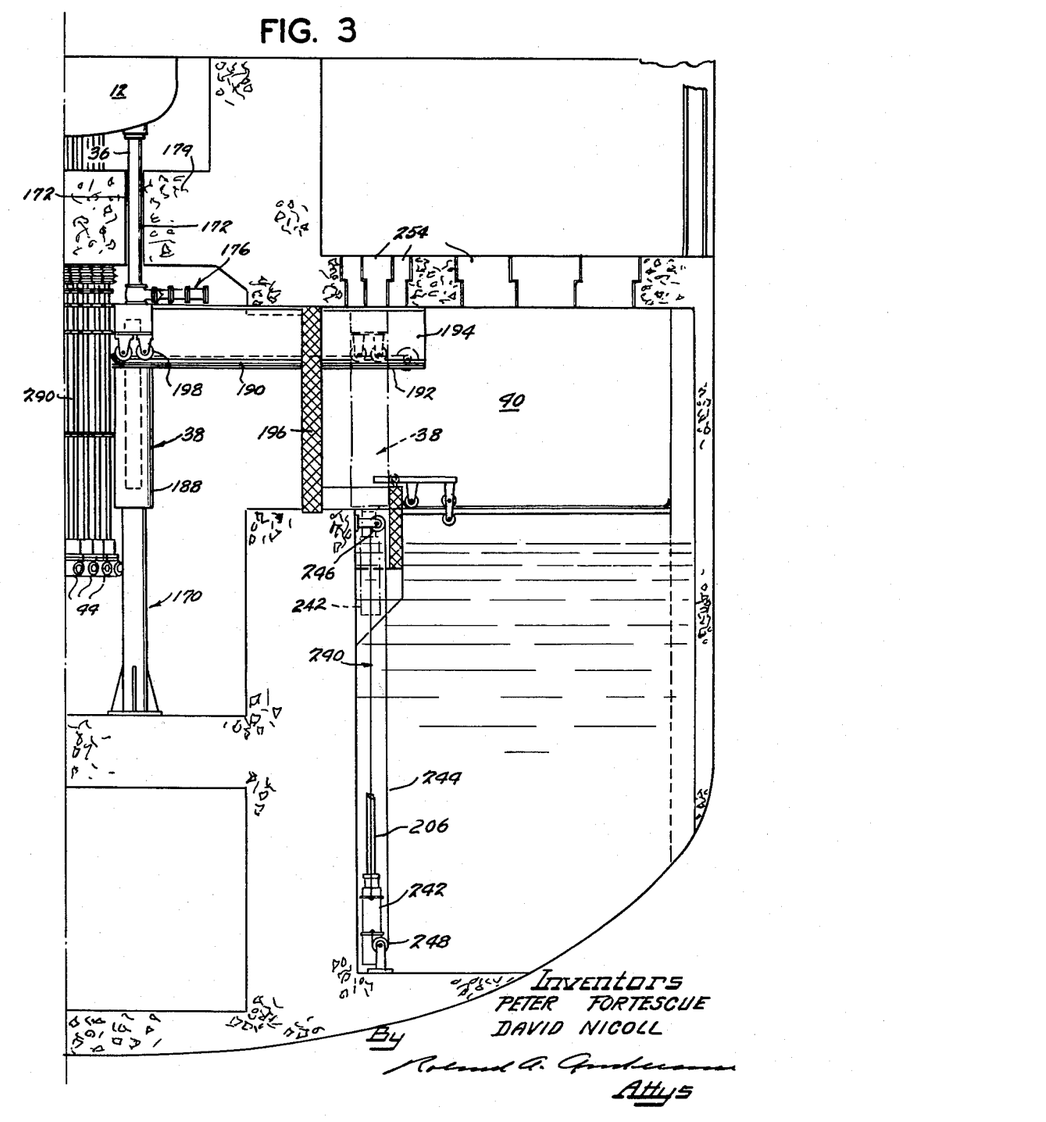
FIG. 3 is an enlarged fragmentary view of the structure shown in FIG. 1.
Figure 4:
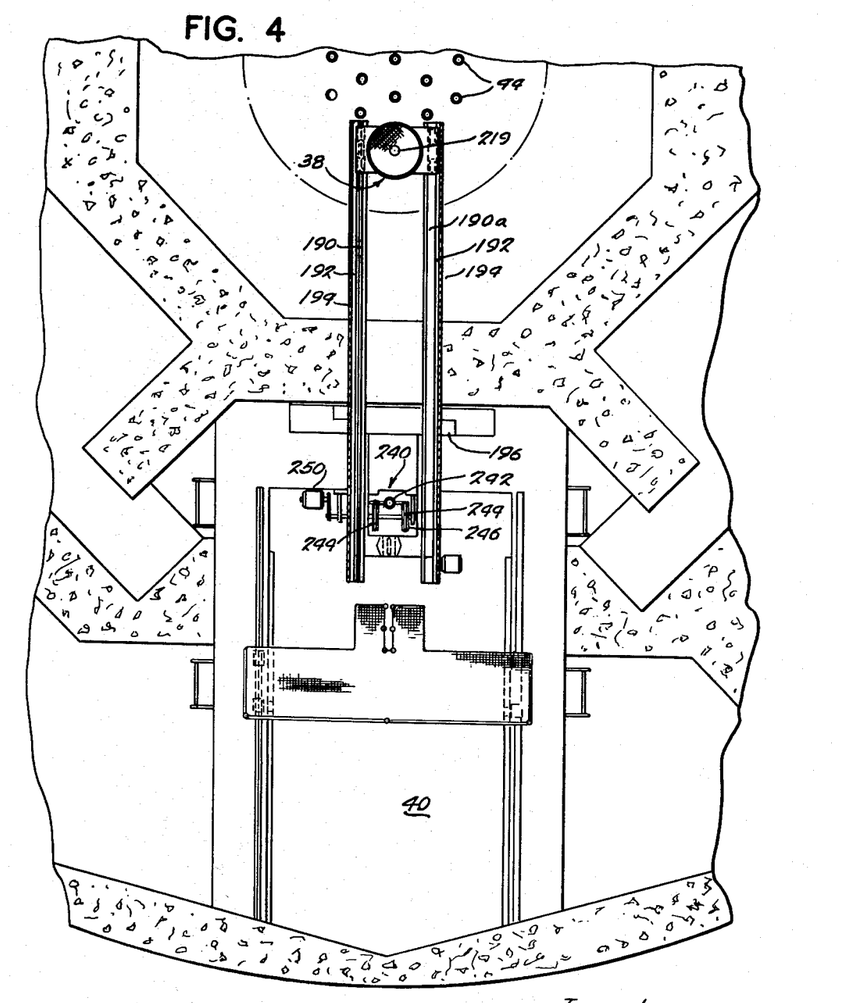
FIG. 4 is a plan view of the structure shown in FIG. 3.

As noted in FIGS. 3 and 4, the transfer coffin 38 is mounted for lateral movement relative to the fuel raising and lowering means 170, through the use of a pair of rails 190 and 190a which are supported on angle irons 192 (FIG. 10) fixed to a pair of generally parallel plate members 194 suitably supported within the reactor enclosure. The plate members 194 and the rails 190 and 190a extend from a position adjacent the lower end of the discharge passage 172 through a removable wall section 196 (FIGS. 3 and 4) and into the fuel storage compartment 40. As noted particularly in FIG. 10, the transfer coffin 38 includes a pair of rollers 198 and 198a respectively, on opposite sides thereof with at least one of the rollers (198) being flanged to guidedly engage the underlying rail.

Figures 10, 11:
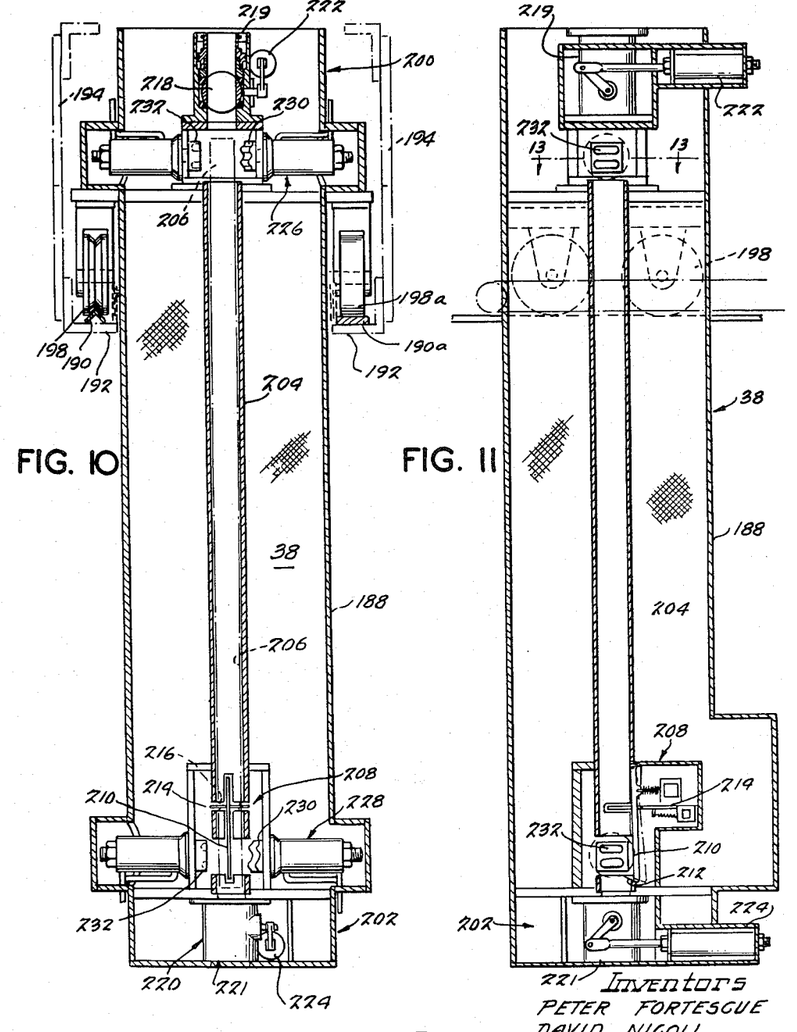
FIG. 10 is an enlarged elevational view of a portion of the structure shown in FIG. 5.
FIG. 11 is an end view of the structure in FIG. 10.
Figure 12:
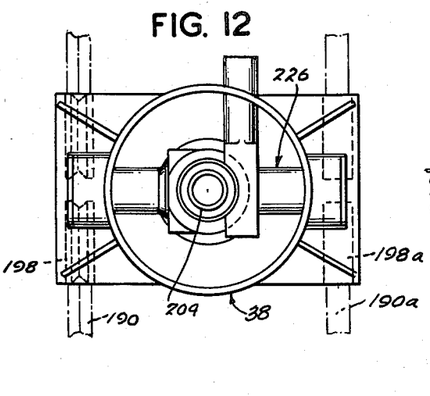
FIG. 12 is a plan view of the structure in FIG. 10.
Figure 13:
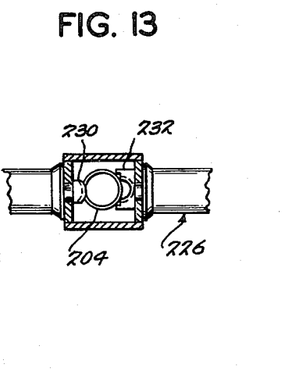
FIG. 13 is a sectional view taken along the line 13—13 in FIG. 11.

As seen in FIGS. 10 and 11, the transfer coffin comprises the generally cylindrical housing portion 188, which is of somewhat greater length than the fuel element to be received therein. Axially of the outer housing 188 and fixedly arranged between a pair of frame structures 200 and 202, which are disposed respectively at the upper and lower end of the coffin, is an elongated tubular member 204 which is adapted to receive an elongated cylindrical canister, shown in dotted lines at 206 in FIG. 10, for housing the spent fuel element. At the lower end of the tubular member 204 is a remotely controlled solenoid operated canister locating and clamping mechanism 208 which is adapted to index the canister with respect to the tube 204 and hold it in a predetermined position. This locating and clamping mechanism includes a pivotally mounted finger 210 (FIG. 11) including a ledge 212 at its lower end, and finger 210 is mounted on the side of the tube 204 in position to move the ledge 212 into and out of the path of the canister. Also disposed at the lower end of the tube 204 is a transversely disposed generally yoke-like element 214 which is adapted for movement into a position of engagement with an annular groove 216 formed in the lower end of the canister 206. When a canister is lowered into the tube 204 from the upper end thereof, the ledge 212 of the positioning finger 210 is initially disposed within the tube to catch the lower end of the canister and index it vertically with respect to the tube. At such time, the transversely movable yoke 214 is caused to move into engagement with the annular groove 216 of the canister by a controlling solenoid within the mechanism 208 and thereby clamps the canister in position. The finger 210 is then moved out of the tube to the position indicated in broken lines in FIG. 11 by a controlling solenoid within the mechanism 208.

Adjacent the upper and lower ends of the transfer coffin 38 are a pair of ball valves 218 and 220, respectively, which are adapted and arranged to selectively seal off the upper and lower end of the passage through the transfer coffin. Each of these valves 218 and 220 is suitably connected with a pressure fluid cylinder 222 and 224, respectively, for actuation by the latter. When these valves are open, there is a free passage through the center of the transfer coffin 38 from its upper to its lower end. As indicated previously, the upper end of this passage is adapted to coincide with the lower end of the discharge passage section 172 to provide a continuation thereof, and the lower end of the passage through tube 204 is adapted to mate with the housing 178 for the telescopic raising and lowering piston. Suitable remotely controlled pneumatically operated seals 219 and 221 (FIG. 10) are provided at the ends of the passage through the transfer coffin for making contact seals with the lower end of the flange of the isolation valve 176 and the upper flange surface of the telescopic tube housing 178, respectively, thereby forming a sealed passage for the transfer of the fuel elements.

When a canister is disposed within the central tube 204 of the transfer coffin and held by the clamping yoke 214, it projects beyond this tube at opposite ends thereof. These projecting portions are then each disposed within an enclosure which includes means for crimping the opposite projecting ends of the canister to seal the latter, as indicated at 226 and 228. Each crimping means includes generally a male die section 230 and a female die section 232 which are movable transversely of the passageway through the transfer coffin in a direction toward each other, to thereby engage and crimp the ends of the canister together. These crimping dies are preferably operated by pressure fluid cylinders which may receive their fluid pressure from the reactor or an independent source, as desired. Also associated with the transfer coffin 38 and in communication therewith, is a source of helium pressure (not shown), which may be derived either from the reactor gas coolant or independently thereof, and which is adapted to fill the transfer coffin with helium at a pressure slightly greater than the reactor vessel pressure, in order to insure that leakage will be toward the reactor pressure vessel.

Figures 14, 15:
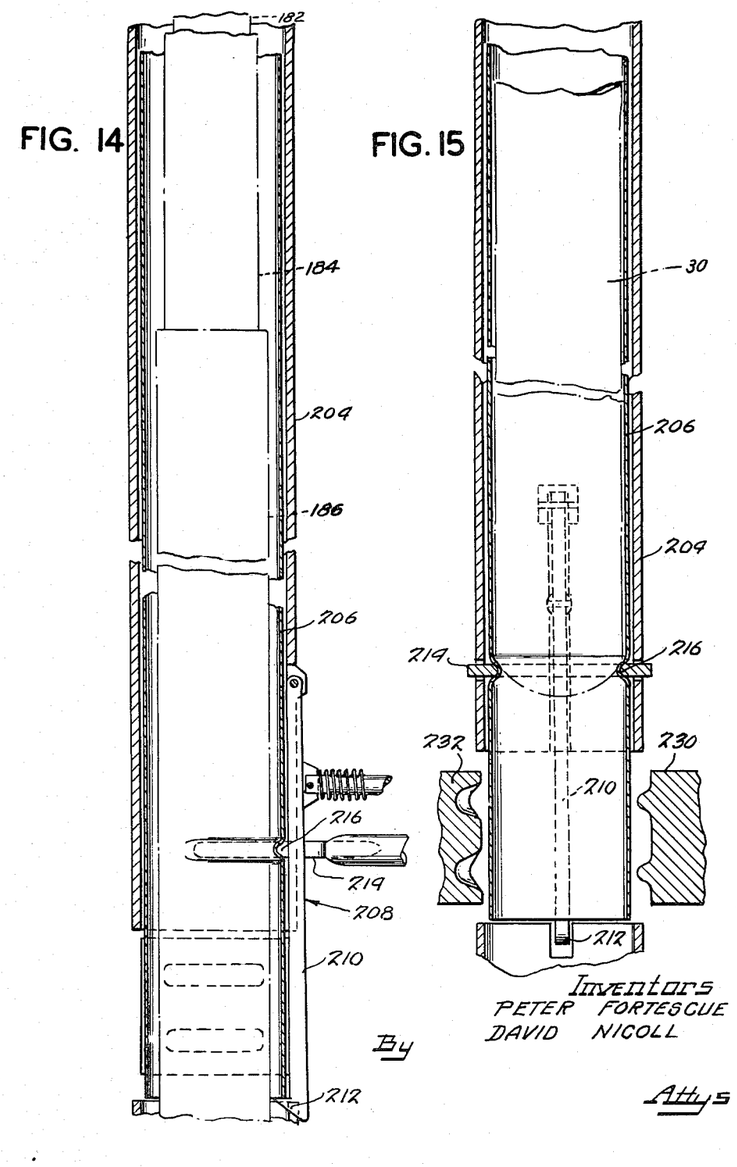
FIG. 14 is an enlarged fragmentary view of the structure in FIG. 11.
FIG. 15 is a side elevational view of the structure in FIG. 14.

It is seen therefore, that after an empty canister has been placed within the transfer coffin 38, from a position within the storage compartment 40, the transfer coffin is moved along the rails 190, 190a to a position directly beneath the reactor discharge passage 172. The pneumatically operated seals 219 and 221 are closed and pressurized gas, such as helium, is then introduced into the coffin tube 204, at slightly greater than reactor pressure, to purge the coffin tube of air and minimize any outward leakage of radioactive fission product gases during the subsequent transfer operation. The flow of helium into the reactor is maintained during the subsequent period of time when the reactor vessel is open to the coffin 38. The upper and lower ball valves 218 and 220 are then opened and the isolation valve 176 at the lower end of the discharge tube is also opened after the coffin 38 is thus in place. The telescopic piston 180 is then moved upwardly through the transfer coffin and discharge tube into the discharge passage 36, in a position of engagement with the lower end of a fuel element or rod which is being held at its upper end by the grappler mechanism 84 (FIG. 2). The grappler is released and the telescopic piston 180, etc., is retracted to lower the fuel element downwardly through the discharge tube 172 and into the canister 206 within the transfer coffin. The lower end of the fuel element comes to rest on the ledge provided by the annular groove 216 adjacent the lower end of the canister, as seen in FIG. 15. The isolation valve 176 (FIG. 5) at the lower end of the discharge tube 172 is then closed and, also, the ball valve 218 at the upper end of the transfer coffin. The next operation is to seal the ends of the canister by moving the dies 230 and 232 (FIG. 10) of the crimping mechanism against the canister so as to collapse the tube. The coffin is then purged of helium which is returned to the helium clean-up system and the entire unit including the canister is depressurized and filled with air to atmospheric pressure through suitable means (not shown). The transfer coffin 38 is now in readiness for movement through the lead shield doors 196 (FIGS. 3 and 4) that isolate the transfer room from the storage compartment 40.

In the storage compartment there is provided means for unloading the canister containing the spent fuel element and for storing it under water until the radiation level of the element has decreased sufficiently to permit further processing.

Figures 16, 17:
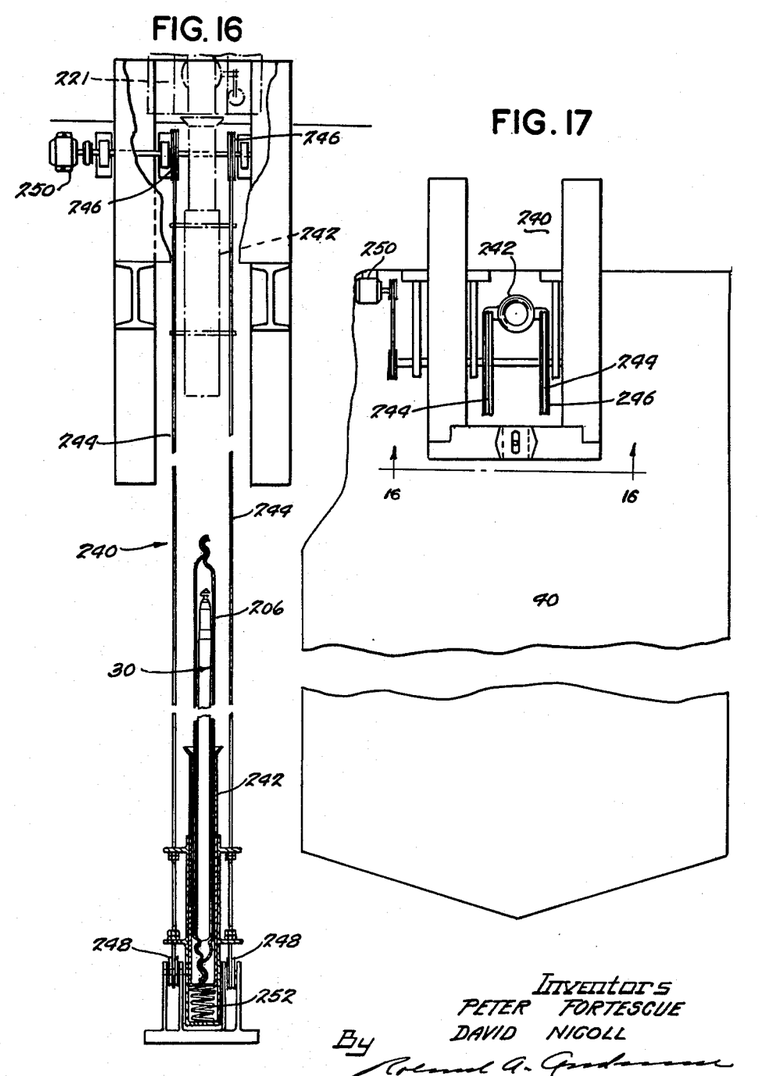
FIG. 16 is an enlarged end view of a portion of the structure shown in FIG. 3, with parts broken away and in section.
FIG. 17 is a plan view of the structure in FIG. 16.

More particularly, as seen in FIGS. 3, 16 and 17, there is provided adjacent the ends of the transfer coffin track and along one wall of the storage tank 40, a canister raising and lowering means 240 which is adapted to lower the canister 206 from its position in the transfer coffin to a position within the storage tank 40. This canister raising and lowering mechanism includes a generally tubular receptacle 242 which is supported by a pair of cables 244 arranged around pairs of pulleys 246 and 248 at the upper and lower end, respectively, of the storage tank. The upper pulleys 246 are driven by a motor 250 (FIG. 16) so as to selectively position the tubular receptacle 242 in underlying relation to the transfer coffin. When the receptacle 242 is disposed directly below the transfer coffin, as indicated in dotted lines in FIG. 16, the clamping mechanism 208 (FIG. 11) in the latter is actuated to release the canister and permit it to fall into the underlying receptacle. The receptacle 242 includes a cushioning means, such as a spring 252 (FIG. 16), to minimize the shock as the canister is dropped into the receptacle. The receptacle is then lowered into the water and the transfer coffin 38 is in readiness to receive another canister.

It will be understood, of course, that the operation of the transfer coffin 38, the fuel raising and lowering mechanism 170, and the canister raising and lowering mechanism 240 are suitably remotely controlled in any known manner (not shown). In the illustrated embodiment the floor of shield material overlying the storage compartment includes removable sections 254 (FIG 3) which permits lowering of new elements and rods, as well as canisters, into the transfer coffin. Moreover, when the spent fuel elements are ready for reprocessing or other disposal they can be removed through the openings provided for by the removable floor sections.

The introduction of new fuel elements or control rods into the reactor core 24 is achieved in generally the reverse manner of that described above with respect to unloading. As the coffin 38 containing the element is positioned below the reactor discharge tube 172, the fuel raising and lowering mechanism 170 will move through the open valve 220 (FIG. 10) and engage the element to move the latter upwardly past the open ball valve 218 and isolation valve 176 into the fuel element transfer passage 36 in the reactor vessel. During the transfer of the fuel element from the coffin 38 to the reactor vessel 12, the coffin is subjected to helium pressure in excess of that present in the vessel to prevent leakage outwardly of the vessel. As the new element is raised to a position projecting above the discharge passage 36, the pick-up mechanism 34 is operated to engage the upper end of the element, withdraw it from the discharge passage 36, and deposit the element in an available opening in the reactor core 24. The pick-up mechanism is then retracted into its housing 46 and isolation valves 52 and 176 are closed to thereby place the reactor in condition for operation.

Although shown and described with respect to particular apparatus, it will be apparent to those skilled in the art that various modifications of the described structure might be made without departing from the principles of the present invention.

We claim:

1. In combination with a neutronic reactor of the type having a vessel, a core including a plurality of parallel, vertically extending fuel channels arranged about the reactor axis, and having a vertically disposed transfer passage affording passage of a fuel element between the interior of the vessel and the exterior thereof, a fuel element transfer means comprising a vertically adjustable fuel element supporting device positioned for movement from a position spaced below said vessel to a position within said transfer passage, a transfer coffin having a vertically extending central passage therethrough, means supporting said coffin for lateral movement relative to a position of axial alignment with said fuel element supporting device wherein said central passage affords movement of said supporting device therethrough, said transfer coffin and central passage therethrough having a length greater than the length of a fuel element, and a crimping device on said coffin adjacent opposite ends of said central passage in position to crimp and seal the ends of a tubular canister positioned within said passage.

2. In combination with a neutronic reactor of the type having a pressure vessel, a core including a plurality of parallel, vertically extending fuel channels arranged about the reactor axis, and having a vertically disposed transfer passage leading from the interior of said vessel and affording passage of a fuel element between the interior of the vessel and the exterior thereof, a fuel element transfer means comprising a vertically adjustable fuel element supporting device positioned for movement from a position spaced below said vessel to a position within said vessel in said transfer passage, a transfer coffin having a vertically extending central passage therethrough, means supporting said coffin for lateral movement relative to a position of axial alignment with said fuel element supporting device wherein said central passage affords movement of said fuel element supporting device therethrough, valve means on said coffin at opposite ends of said central passage for sealing off the latter, said transfer coffin and central passage therethrough having a length greater than the length of a fuel element, a crimping device on said coffin adjacent each of the opposite ends of said central passage in position and operable to crimp and seal the ends of a tubular fuel element receiving canister positioned within said passage, means affording the introduction of pressure fluid into said transfer coffin at a pressure greater than that within said vessel, whereby leakage outwardly of said vessel is prevented, and fluid pressure means for operating said fuel element supporting device, said valve means and said crimping device.

3. For use with a neutronic reactor of the type having a pressure vessel, a core including a plurality of parellel, vertically extending fuel channels arranged about the reactor axis, and having a vertically disposed transfer passage leading from the interior of said vessel and affording passage of a fuel element between the interior of the vessel and the exterior thereof, a fuel element transfer means comprising a vertically adjustable fuel element supporting device positioned for movement from a position spaced below said vessel to a position within said vessel in said transfer passage, a transfer coffin havin a vertically extending central passage therethrough, means supporting said coffin for lateral movement relative to a position of axial alignment with said fuel element supporting device wherein said central passage through said coffin affords movement of said supporting device therethrough, a pair of valve means on said coffin which are disposed, respectively, at opposite ends of said central passage and which are operable to seal off the latter, said transfer coffin and central passage therethrough having a length greater than the length of a fuel element, a crimping device on said coffin adjacent each of the opposite ends of said central passage in position to crimp and seal the ends of a tubular fuel element receiving canister positioned within said passage, means carried by said coffin for releasably retaining a fuel element therein in predetermined fixed relation to said valve means and crimping devices, means affording the introduction of pressure fluid into said transfer coffin at a pressure greater than that within said vessel, whereby leakage outwardly of said vessel is prevented by delivering fluid pressure through the upper one of said valve means during the transfer of an element relative to said vessel, and fluid pressure means for operating said supporting device, said valve means and said crimping devices.

4. Fuel element and control rod transfer apparatus adapted for use with a gas cooled neutronic reactor of the type having a pressure vessel including a core defining a plurality of parallel, vertically extending fuel and control rod channels arranged about the reactor axis, and said reactor vessel including a vertical passage therethrough affording transfer of fuel elements and control rods between the interior and exterior of said vessel, said apparatus comprising a vertically adjustable element-supporting means adapted for axial movement relative to the transfer passage and supported within a housing disposed in vertically spaced, underlying relation to said vessel, a transfer coffin adapted for positioning in coaxial relation to said element-supporting means and movable laterally of said position to a fuel element storage and replacement location, said transfer coffin including means for supporting a tubular canister in fixed coaxial relation within said coffin, and means carried by said transfer coffin for crimping and sealing the opposite ends of a canister contained therein, whereby said transfer coffin is operable to receive from said supporting means an element which is withdrawn from said vessel and disposed in fixed position within said canister, to seal the element within the canister by crimping the ends of the latter, and also operable to remove the canister to the fuel element storage facility remote from said reactor vessel.

5. In combination with a gas cooled neutronic reactor of the type having a plurality of parallel, vertically extending fuel channels arranged about the reactor axis, and having a reactor vessel including a vertical passage therethrough affording transfer of fuel elements and control rods between the interior and exterior of said vessel, a fuel element and control rod transfer apparatus comprising a vertically extensible element-supporting means adapted for raising and lowering movement relative to a position within the transfer passage and supported within a housing which is disposed in vertically spaced, underlying relation to said vessel, a transfer coffin adapted for positioning in coaxial relation to said element supporting means and movable laterally of said position to a fuel element storage and replacement facility, said transfer coffin including means for releasably indexing and supporting a tubular canister in fixed coaxial relation within said coffin, and means carried by said transfer coffin in position for forcing engagement with the opposite ends of a canister contained therein to thereby crimp and seal said canister, and means for moving said transfer coffin laterally of said element supporting means of a storage facility where said canister indexing and supporting means is operated to discharge said canister from said transfer coffin.

References Cited by the Examiner

UNITED STATES PATENTS

| 3,051,642 | 8/62 | Dent | 176—30 |
| 3,058,900 | 10/62 | Frisch | 176—30 |
| 3,121,045 | 2/64 | Harris et al. | 176—36 |
| 3,124,513 | 3/64 | Hawke et al. | 176—36 |

CARL D. QUARFORTH, *Primary Examiner.*

L. DEWAYNE RUTLEDGE, *Examiner.*